(12) United States Patent
Harrington et al.

(10) Patent No.: US 9,937,394 B2
(45) Date of Patent: Apr. 10, 2018

(54) IRON TYPE GOLF CLUB HEAD CONSTRUCTION

(71) Applicant: Acushnet Company, Fairhaven, MA (US)

(72) Inventors: James P. Harrington, Del Mar, CA (US); Michael E. Franz, Encinitas, CA (US); Oswaldo Gonzalez, San Jacinto, CA (US)

(73) Assignee: Acushnet Company, Fairhaven, MA (US)

( * ) Notice: Subject to any disclaimer, the term of this patent is extended or adjusted under 35 U.S.C. 154(b) by 301 days.

(21) Appl. No.: 14/788,399

(22) Filed: Jun. 30, 2015

(65) Prior Publication Data

US 2017/0001081 A1   Jan. 5, 2017

(51) Int. Cl.
| | |
|---|---|
| A63B 53/04 | (2015.01) |
| B21D 53/00 | (2006.01) |
| B21K 17/00 | (2006.01) |
| B21J 1/04 | (2006.01) |
| A63B 53/02 | (2015.01) |
| B23P 13/02 | (2006.01) |

(52) U.S. Cl.
CPC ............ *A63B 53/047* (2013.01); *A63B 53/02* (2013.01); *B21J 1/04* (2013.01); *B21K 17/00* (2013.01); *A63B 2053/0408* (2013.01); *B23P 13/02* (2013.01)

(58) Field of Classification Search
CPC . A63B 53/04; A63B 53/0407; A63B 53/2053; A63B 53/0404; A63B 53/0479; A63B 53/0483; B21K 17/00; B23C 3/12; B23P 13/02; B23P 23/02; B21J 1/04
USPC ...................................... 72/340, 341
See application file for complete search history.

(56) References Cited

U.S. PATENT DOCUMENTS

| | | | | |
|---|---|---|---|---|
| 4,750,537 A | * | 6/1988 | Green .................. | B23Q 1/4804 144/134.1 |
| 5,395,109 A | * | 3/1995 | Fenton, Jr. ............. | A63B 53/02 473/291 |
| 5,429,353 A | * | 7/1995 | Hoeflich ................ | A63B 53/04 473/291 |
| 7,153,222 B2 | * | 12/2006 | Gilbert ................ | A63B 53/047 473/290 |
| 2002/0016217 A1 | * | 2/2002 | Takeda ................... | A63B 53/02 473/324 |
| 2003/0015015 A1 | * | 1/2003 | Takeda ................... | A63B 53/04 72/340 |

* cited by examiner

*Primary Examiner* — A. Dexter Tugbang
*Assistant Examiner* — Joshua D Anderson
(74) *Attorney, Agent, or Firm* — Kevin N. McCoy

(57) ABSTRACT

A method of manufacturing an iron type golf club head, including forming an iron type golf club head blank, the iron type golf club head blank having an oversized hosel portion and an oversized body portion, the iron type golf club head blank configured to accommodate a plurality of iron type golf club heads, each iron type golf club head having a unique loft angle; and removing material from said oversized body portion of said iron type golf club head blank.

20 Claims, 16 Drawing Sheets

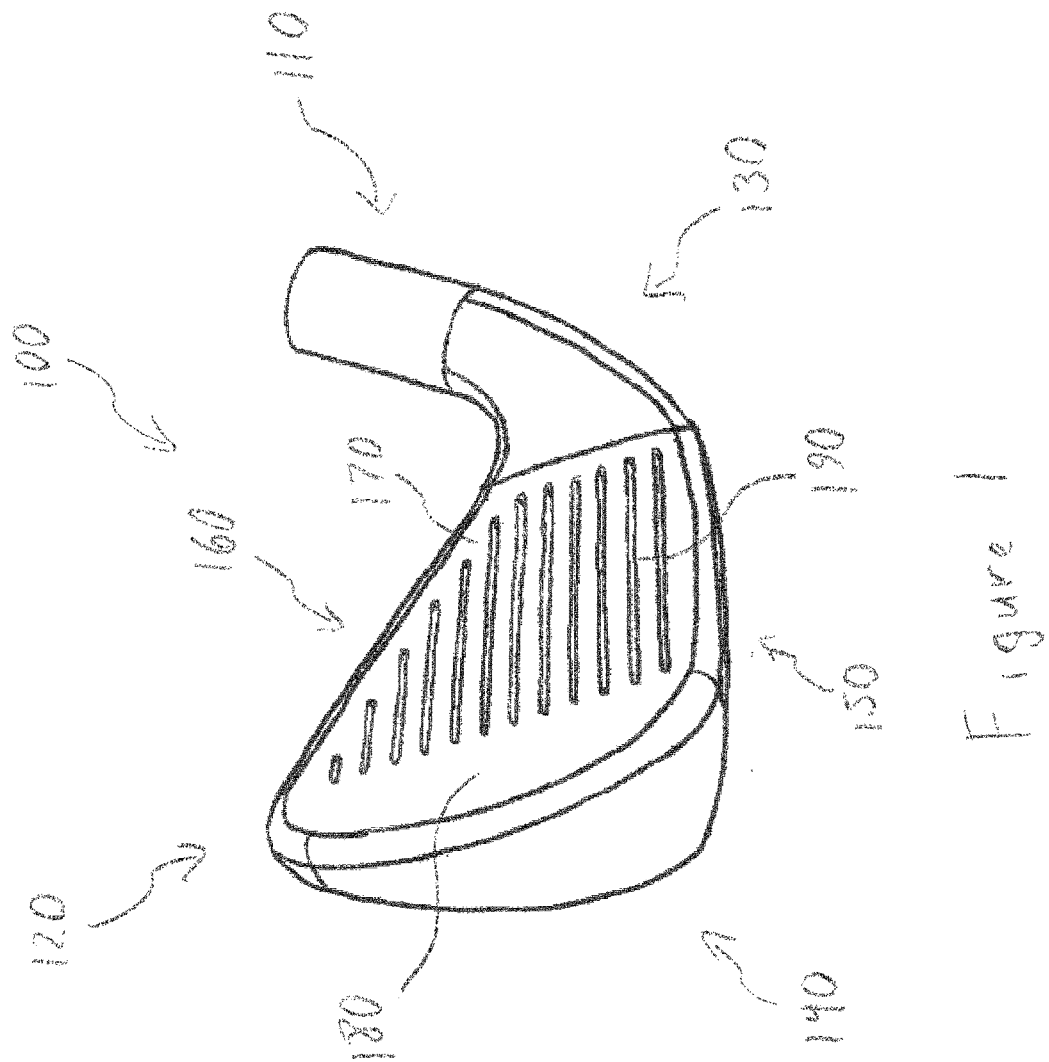

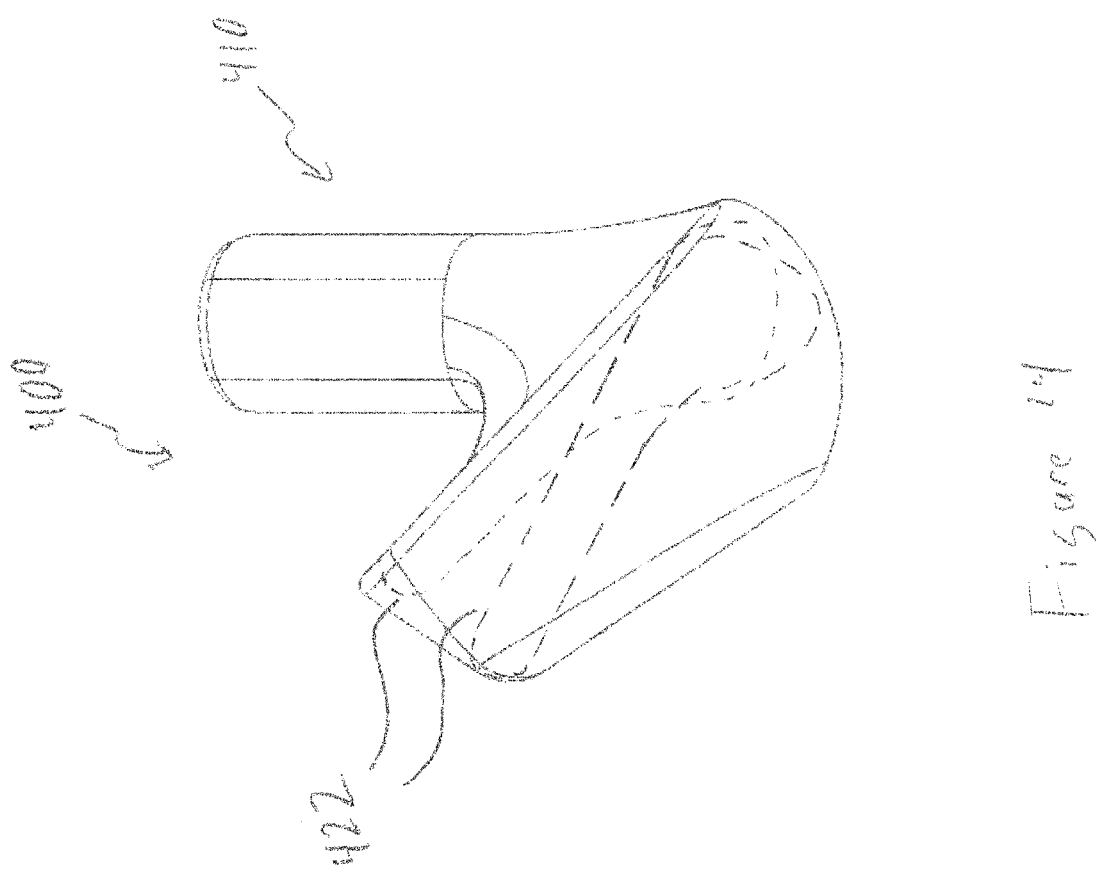

US 9,937,394 B2

IRON TYPE GOLF CLUB HEAD CONSTRUCTION

TECHNICAL FIELD

This present technology generally relates to systems, devices, and methods related to golf club head construction. More specifically, the present technology relates to multiple iron type golf club heads with different characteristics manufactured from club head blanks sharing the substantially the same dimension.

DESCRIPTION OF THE RELATED TECHNOLOGY

Golf clubs, combined with golf balls, have generally been considered to be the most essential equipment in the game of golf. Progressing in parallel with the development of the game of golf, significant developments have occurred within the golf equipment industry. Golf clubs have also developed simultaneously with all other types of golf equipment to accommodate for the needs of the golfer to hit their shots more accurately and with more control.

Iron type golf clubs include both conventional iron clubs as well as wedges. Each golf club includes a shaft with a club head attached to the distal end of the shaft and a grip attached to the proximal end of the shaft. The club head includes a face for striking a golf ball. In general, the greater the loft of the golf club in a set, the greater the launch angle and the less distance the golf ball is hit. A set of conventional irons generally includes individual irons that are designated as number 3 through number 9, and a pitching wedge. The conventional iron set is generally complimented by a series of wedges, such as a lob wedge, a gap wedge, and/or a sand wedge. Sets can also include a 1 and 2 iron, but these golf clubs are generally sold separately from the set. Each iron type golf club has a shaft length that usually decreases through the set as the set as the loft for each golf club head increases, from the long irons to the short irons. Additionally, iron type golf clubs generally include grooves running across the striking face from the heel towards the toe to increase the friction between the striking face and golf ball, inducing spin on the golf ball as the striking face impacts the golf bal. Wedges, are a particular type of iron type golf club that generally has a higher loft angle. These higher lofted wedges tend to be precision instruments that allow a golfer to dial in short range golf shots with improved trajectory, improved accuracy, and improved control.

Conventional iron type golf club heads are created in a variety of ways, some of which include castings, forgings, as well as combinations of the two. Generally, conventional production iron type golf club heads are cast or forged to a near net final shape, such that only minor machining and/or grinding operations are necessary to achieve the finished product.

SUMMARY

The systems, methods, and devices described herein have innovative aspects, no single one of which is indispensable or solely responsible for their desirable attributes. Without limiting the scope of the claims, some of the advantageous features will now be summarized.

One aspect of the present technology is the realization that conventional iron type golf club head construction limits the number of options available to a consumer and requires a large amount of individual tooling and equipment for each individual club head. Thus, there exists a need for an improved method of manufacturing an iron type golf club head.

One non-limiting embodiment of the present technology includes a method of manufacturing an iron type golf club head, comprising: forming an iron type golf club head blank; said iron type golf club head blank comprising oversized hosel portion and an oversized body portion, said iron type golf club head blank configured to accommodate a plurality of iron type golf club heads, each iron type golf club head having a unique loft angle; removing material from said oversized body portion of said iron type golf club head blank.

An additional non-limiting embodiment of the present technology further comprises specifying said loft angle and selectively removing material from said oversized body portion to attain said loft angle.

In an additional non-limiting embodiment of the present technology each iron type golf club head of said plurality of iron type golf club heads has a unique lie angle.

An additional non-limiting embodiment of the present technology further comprises specifying said lie angle and selectively removing material from said oversized hosel portion to attain said lie angle.

In an additional non-limiting embodiment of the present technology said plurality of iron type golf club heads comprises a first golf club head having a first loft angle and a second iron type golf club head having a second loft angle, wherein said first loft angle is approximately 17 degrees and said second loft angle is approximately 60 degrees.

In an additional non-limiting embodiment of the present technology said plurality of iron type golf club heads comprises a first golf club head having a first lie angle and a second iron type golf club head having a second lie angle, wherein said first lie angle is approximately 58 degrees and said second lie angle is approximately 66 degrees.

In an additional non-limiting embodiment of the present technology said oversized hosel portion comprises an oversized shaft axis, a lie width, and a loft width, said lie width measured in a substantially heel toe direction, said loft width measured perpendicular to said lie width, said lie width and said loft width measured perpendicularly to said oversized shaft axis, wherein said lie width is greater than 20 mm.

An additional non-limiting embodiment of the present technology includes a method of manufacturing an iron type golf club head, comprising: forming an iron type golf club head blank; said iron type golf club head blank having an oversized hosel portion, said iron type golf club head blank configured to accommodate a plurality of iron type golf club heads, each iron type golf club head having a unique lie angle; removing material from said oversized hosel portion of said iron type golf club head blank.

In an additional non-limiting embodiment of the present technology further comprises specifying said lie angle and selectively removing material from said oversized hosel portion to attain said lie angle.

In an additional non-limiting embodiment of the present technology said plurality of iron type golf club heads comprises a first golf club head having a first lie angle and a second iron type golf club head having a second lie angle, wherein said first lie angle is approximately 58 degrees and said second lie angle is approximately 66 degrees.

In an additional non-limiting embodiment of the present technology said oversized hosel portion comprises an oversized shaft axis, a lie width, and a loft width, said lie width measured in a substantially heel toe direction, said loft width measured perpendicular to said lie width, said lie width and said loft width measured perpendicularly to said oversized shaft axis, wherein said lie width is greater than 20 mm.

An additional non-limiting embodiment of the present technology includes a method of manufacturing an iron type golf club head, comprising: forming an iron type golf club head blank; said iron type golf club head blank having an oversized hosel portion, said oversized golf club head blank configured to accommodate a plurality of iron type golf club heads, each iron type golf club head having a unique loft angle; removing material from said oversized hosel portion of said iron type golf club head blank.

An additional non-limiting embodiment of the present technology includes specifying said loft angle and selectively removing material from said oversized hosel portion to attain said loft angle.

In an additional non-limiting embodiment of the present technology each iron type golf club head of said plurality of iron type golf club heads has a unique lie angle.

An additional non-limiting embodiment of the present technology includes specifying said lie angle and selectively removing material from said oversized hosel portion to attain said lie angle.

In an additional non-limiting embodiment of the present technology said plurality of iron type golf club heads comprises a first golf club head having a first loft angle and a second iron type golf club head having a second loft angle, wherein said first loft angle is approximately 17 degrees and said second loft angle is approximately 60 degrees.

In an additional non-limiting embodiment of the present technology said plurality of iron type golf club heads comprises a first golf club head having a first lie angle and a second iron type golf club head having a second lie angle, wherein said first lie angle is approximately 58 degrees and said second lie angle is approximately 66 degrees.

In an additional non-limiting embodiment of the present technology said oversized hosel portion comprises an oversized shaft axis, a lie width, and a loft width, said oversized shaft axis comprising the average of lie angle and loft angle of said plurality of iron type golf club heads, said lie width measured in a substantially heel toe direction, said loft width measured perpendicular to said lie width, said lie width and said loft width measured perpendicularly to said oversized shaft axis, wherein said loft width is greater than 20 mm.

In an additional non-limiting embodiment of the present technology said oversized hosel portion comprises an oversized shaft axis, a lie width, and a loft width, said lie width measured in a substantially heel toe direction, said loft width measured perpendicular to said lie width, said lie width and said loft width measured perpendicularly to said oversized shaft axis, wherein said lie width is greater than 20 mm.

In an additional non-limiting embodiment of the present technology forming said iron type golf club head blank comprises forging said iron type golf club head blank and wherein removing material from said oversized hosel portion comprises machining said iron type golf club head blank.

BRIEF DESCRIPTION OF THE DRAWINGS

The accompanying drawings form a part of the specification and are to be read in conjunction therewith. The illustrated embodiments, however, are merely examples and are not intended to be limiting. Like reference numbers and designations in the various drawings indicate like elements.

FIG. 11 illustrates a top view of the iron type golf club head blank of FIG. 9.

FIG. 11B illustrates a top view of the iron type golf club head blank of FIG. 9.

FIG. 12 illustrates a side view of the iron type golf club head blank of FIG. 9.

FIG. 14 illustrates a side view of the iron type golf club head blank of FIG. 9.

DETAILED DESCRIPTION

Figure 2:
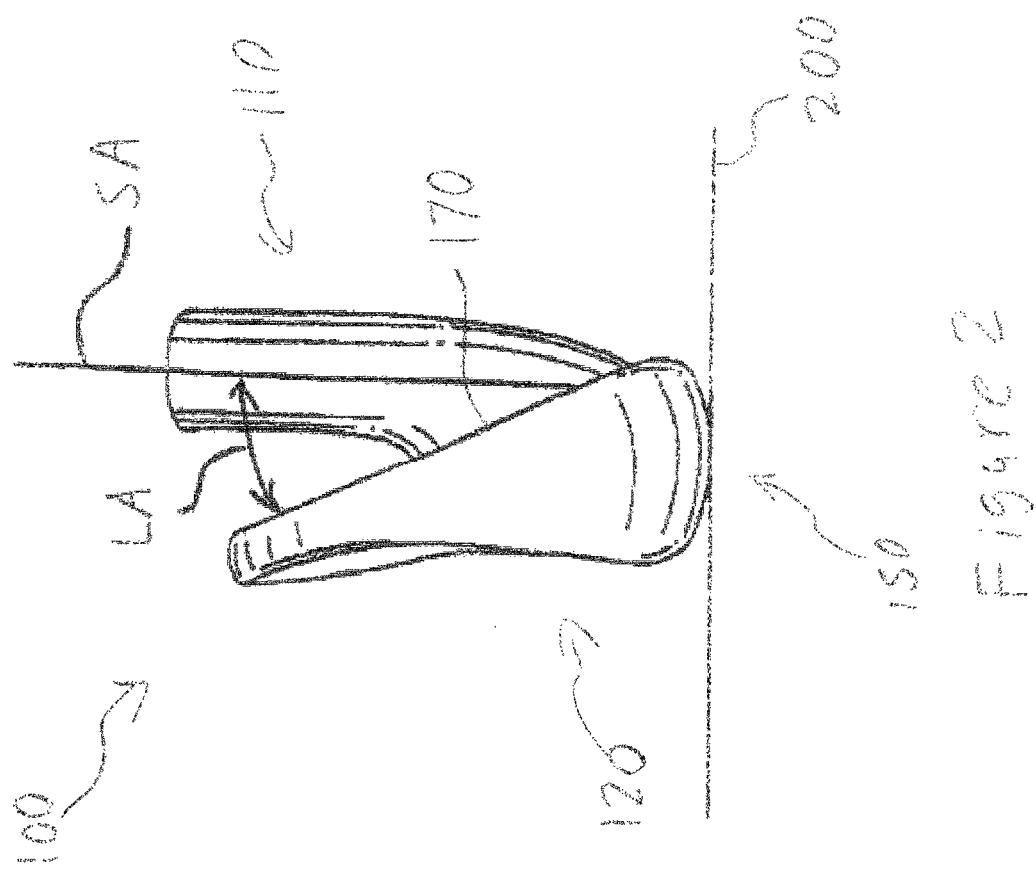
FIG. 2 illustrates a side view of the iron type golf club head of FIG. 1.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, and designed in a wide variety of different configurations, all of which are explicitly contemplated and form part of this disclosure. For example, a system or device may be implemented or a method may be practiced using any number of the aspects set forth herein. In addition, such a system or device may be implemented or such a method may be practiced using other structure, functionality, or structure and functionality in addition to or other than one or more of the aspects set forth herein. Alterations and further and further modifications of inventive features illustrated herein, and additional applications of the principles of the inventions as illustrated herein, which would occur to one skilled in the relevant art and having possession of this disclosure, are to be considered within the scope of the invention.

Other than in the operating examples, or unless otherwise expressly specified, all of the numerical ranges, amounts, values and percentages such as those for amounts of materials, moments of inertias, center of gravity locations, loft and draft angles, and others in the following portion of the specification may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

In describing the present technology, the following terminology may have been used: The singular forms "a," "an," and "the" include plural referents unless the context clearly dictates otherwise. Thus, for example, reference to an item includes reference to one or more items. The term "plurality" refers to two or more of an item. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. A plurality of items may be presented in a common list for convenience. However, these lists should be construed as though each member of the list is individually identified as a separate and unique member. Thus, no individual member of such list should be construed as a de facto equivalent of any other member of the same lists solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to a selection of one of two or more alternatives, and is not intended to limit the selection of only those listed alternative or to only one of the listed alternatives at a time, unless the context clearly indicated otherwise.

Features of the present disclosure will become more fully apparent from the following description and appended claims, taken in conjunction with the accompanying drawings. After considering this discussion, and particularly after reading the section entitled "Detailed Description" one will understand how the illustrated features serve to explain certain principles of the present disclosure.

Figure 3:
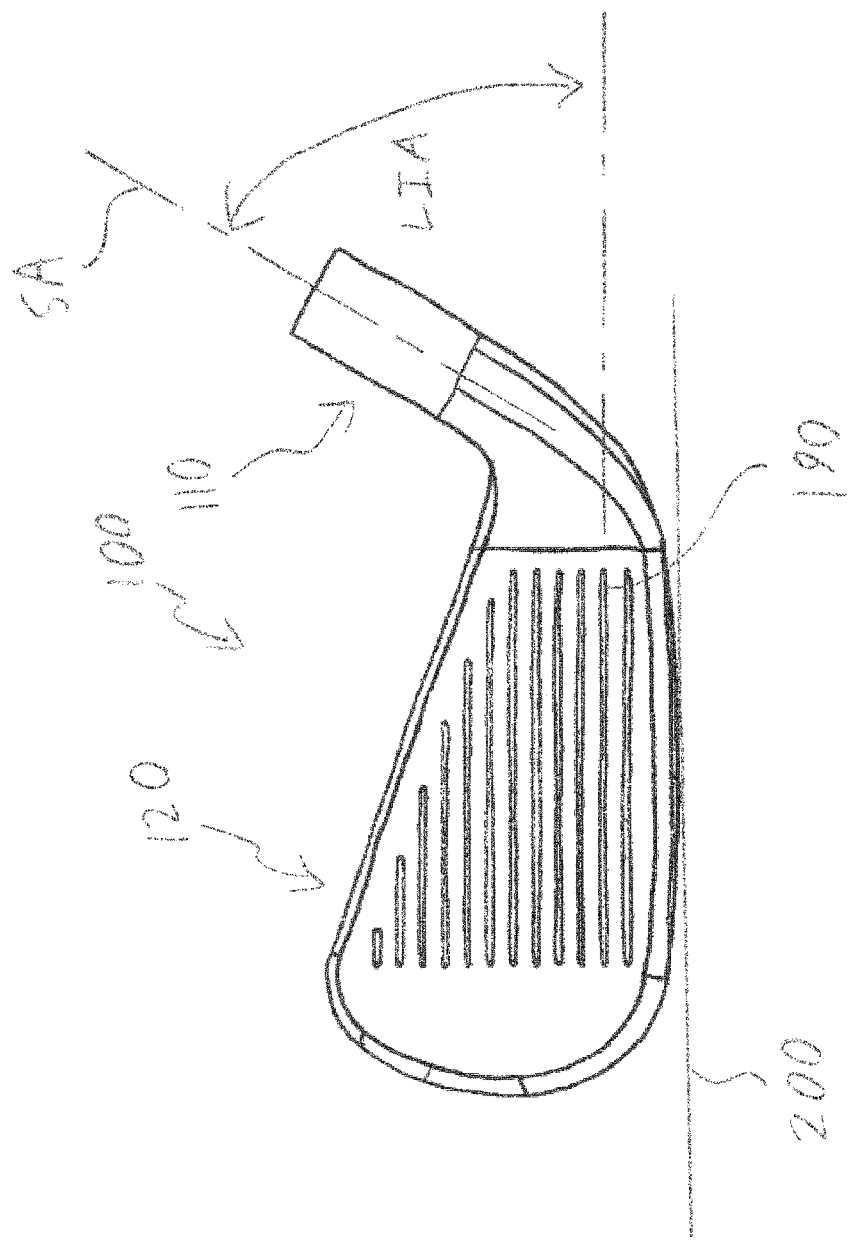
FIG. 3 illustrates a front view of the iron type golf club head of FIG. 1.
Figure 4:
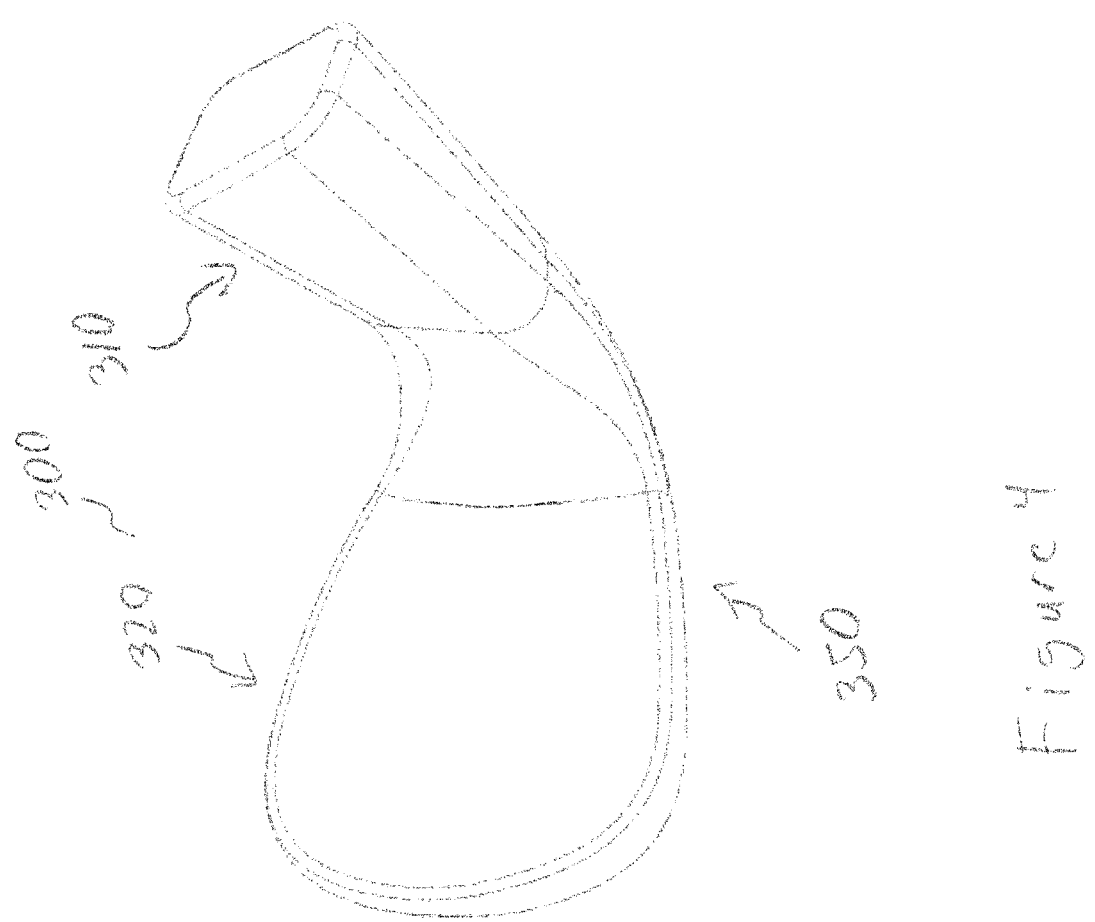
FIG. 4 illustrates a perspective view of one embodiment of an iron type golf club head blank.
Figure 5:
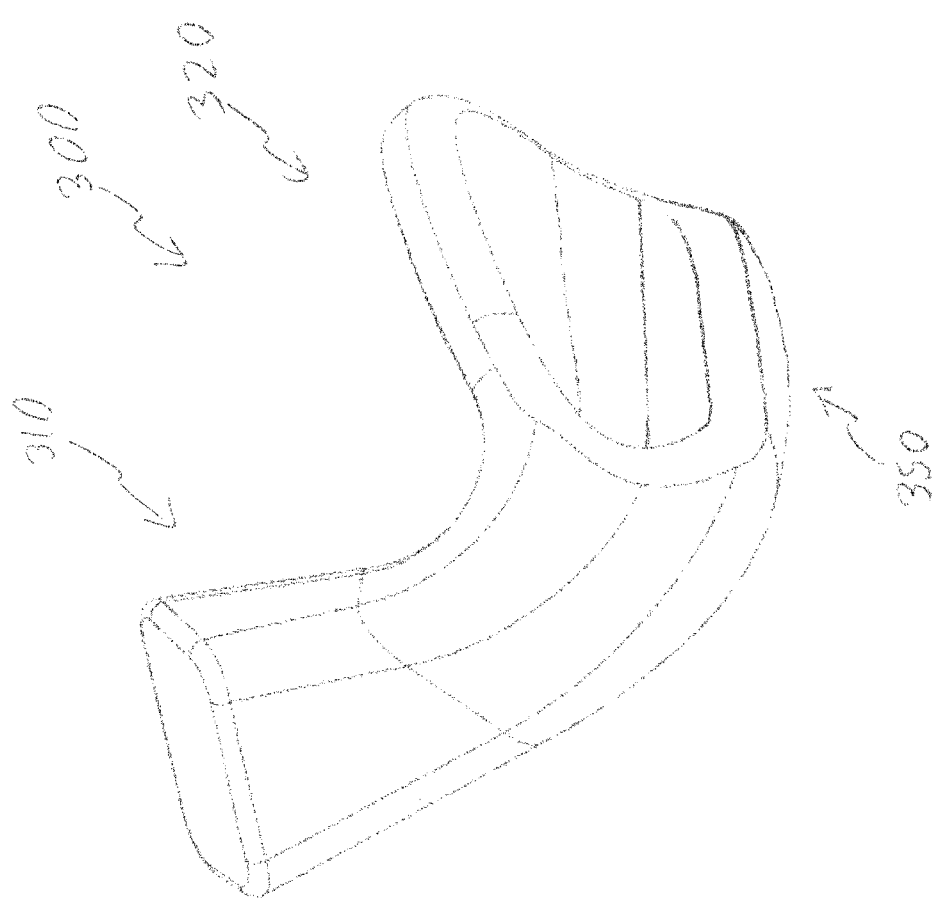
FIG. 5 illustrates an additional perspective view of the iron type golf club head blank of FIG. 4.
Figure 1:
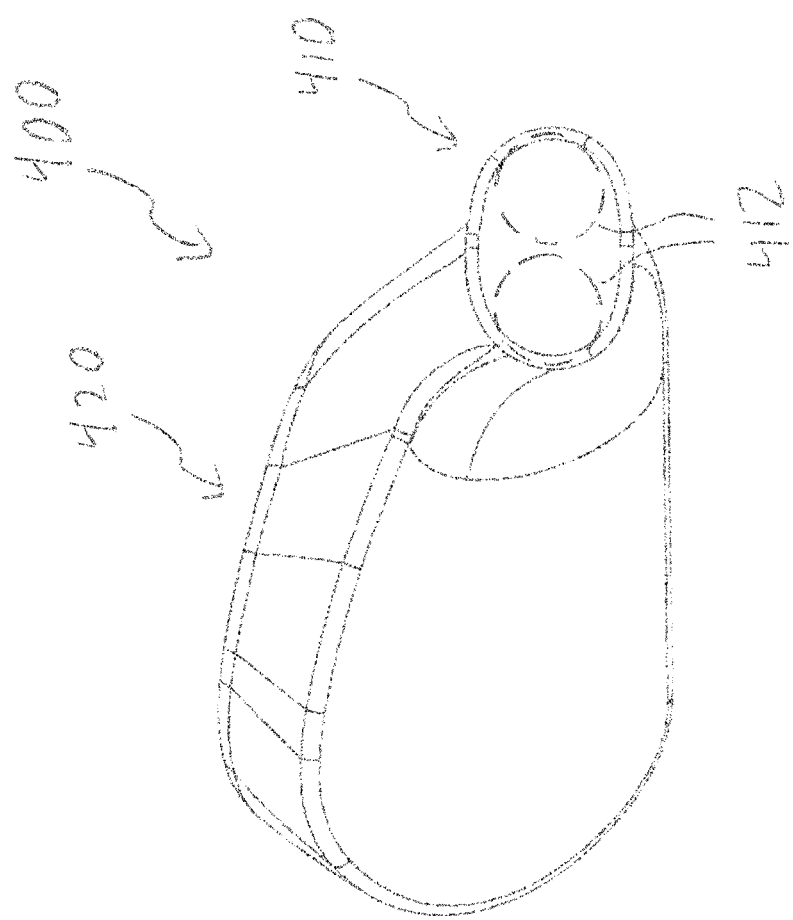
FIG. 1 illustrates a perspective view of one embodiment of an iron type golf club head.
Figure 13:
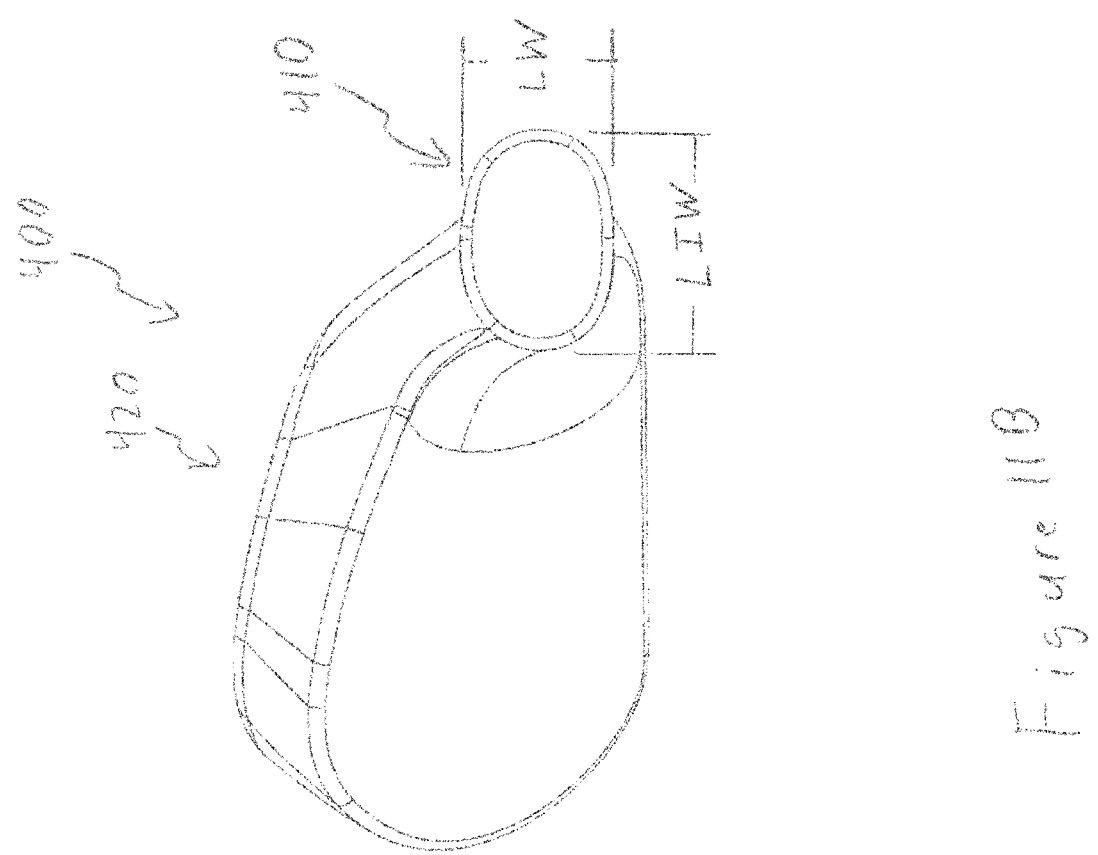
FIG. 13 illustrates a front view of the iron type golf club head blank of FIG. 9.
Figure 17:
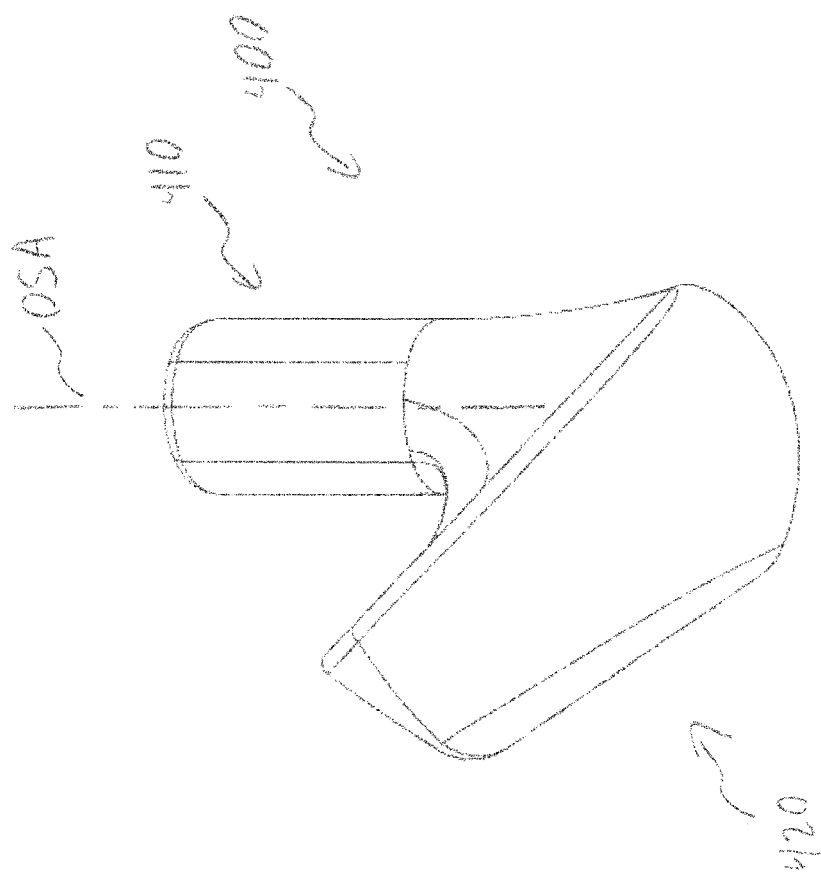
Figure 13:
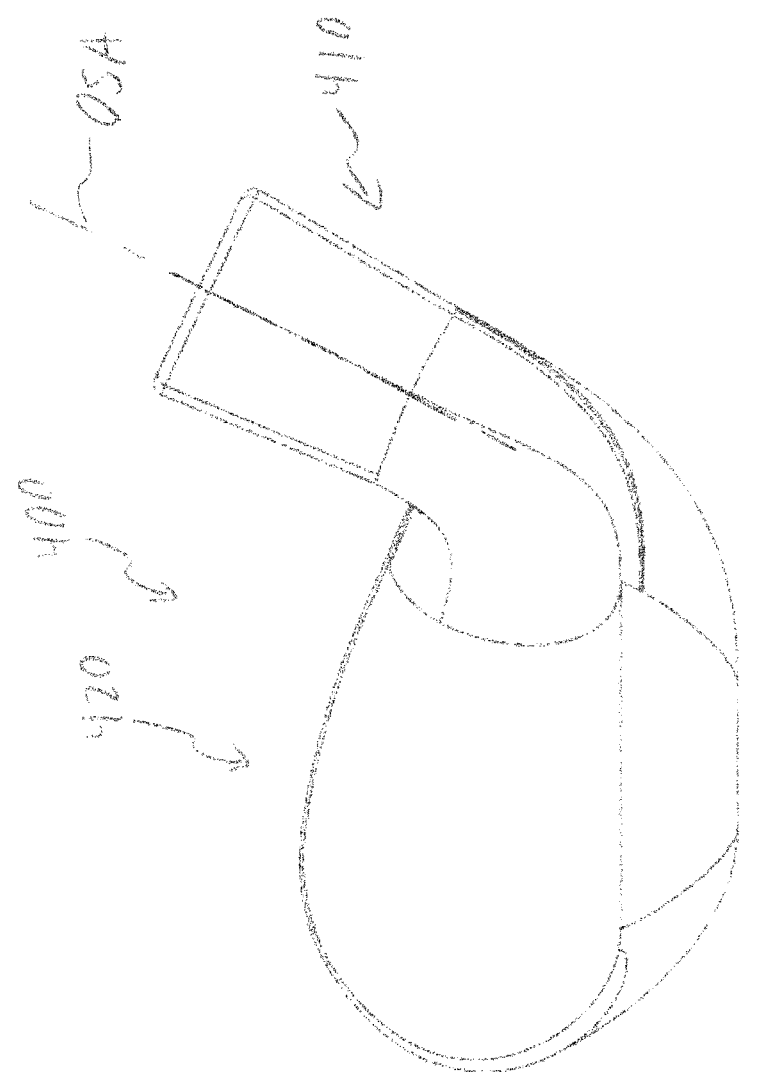

FIG. 1 illustrates a perspective view of one embodiment of an iron type golf club head. FIG. 2 illustrates a side view of the iron type golf club head of FIG. 1. FIG. 3 illustrates a front view of the iron type golf club head of FIG. 1. The particular iron type golf club head illustrated in FIGS. 1-3 is a conventional iron club head, but the term iron type golf club head incorporates wedge club heads in addition to conventional iron club heads. The iron type golf club head includes a hosel 110 connected to a body portion 120. The hosel is located on the heel side 130 of the iron type golf club head, opposite the toe side 140. The hosel 110 is configured to receive the shaft of the golf club. The iron type golf club head 100 includes a sole 150 on a lower surface of the body portion 120 and a topline 160 at the top of the body portion 120. Additionally, the body portion 120 includes a striking face 170 configured to strike a golf ball. As illustrated in FIG. 2, the iron type golf club head 100 has a shaft axis SA extending through the center of the hosel 110. The loft angle LA is formed between the shaft axis SA and a plane formed on the outer surface 180 of the striking face 170 of the iron type golf club head 100.

As illustrated in FIGS. 1 and 3, the iron type golf club head 100 includes scorelines 190 formed in the striking face 170. The scorelines 190 comprise cavities cut or formed into the striking face 170 to enhance the friction between the ball and the striking face 170 during impact. The scorelines run across the striking face 170 from the heel side 130 to the toe side 140. The iron type golf club head is illustrated resting on the ground plane 200 in the address position in FIGS. 2 and 3. Scorelines 190 are generally substantially parallel with the ground plane 200 when the iron type golf club head 100 is in the address position. As illustrated in FIG. 3, the lie angle LIA of the golf club head 100 is defined as the acute angle formed between the shaft axis SA and the scorelines 190.

Golfers tend to prefer particular characteristics in their iron type golf club heads, including for example the loft angle, the lie angle, and the shape of the sole. Creating iron type golf club heads to satisfy the majority of golfers and their various preferences can be difficult and costly, due to the large volume of tooling and manufacturing machinery necessary to create the vast spectrum of iron type golf club heads. In some cases, the material used to create an iron type golf club head doesn't lend itself to bending processes after manufacture in order to adjust parameters such as loft angle and lie angle. Additionally, some golfers prefer a forged iron type golf club head and the tooling necessary to create a forged iron type golf club head is particularly costly. Keeping an inventory of iron type golf club heads large enough to satisfy the broad spectrum of golfers can be costly. The alternative of manufacturing iron type golf club heads to order, can increase lead time dramatically. Therefore, an improved method of iron type golf club head manufacturing is described herein.

In some embodiments, an iron type golf club head blank 300, 400, such as those illustrated in FIGS. 4-14, can be created as an intermediary step in the iron type golf club head manufacturing process. An iron type golf club head blank 300, 400 can be oversized in various areas, allowing a single iron type golf club head blank 300, 400 to be subsequently modified into any one of a plurality of iron type golf club head configurations. The iron type golf club head blanks 300, 400 can be formed into a near net shape, minimizing the amount of modification necessary to achieve the desired iron type golf club head configuration. Embodiments of iron type golf club head blanks 300, 400 and methods of manufacturing iron type golf club heads are discussed herein.

As illustrated in FIGS. 4-8, an iron type golf club head blank 300 can be created. The iron type golf club head blank 300 can be formed with additional material when compared to a final iron type golf club head 100. The iron type golf club head blank 300 can be formed in a variety of ways which may include, for example, forging, casting, powdered metallurgy, injection molding, demascusing, mokume-gane, three dimensional printing, three dimensional welding, etc. In some embodiments, the iron type golf club head blank 300 is configured to accommodate a variety of iron type golf club head 100 configurations, each with different characteristics. Those different characteristics can include, for example, loft angle LA, lie angle LIA, the shape of the sole 150, the location of the center of gravity, top line thickness, aesthetics, score line dimensions, etc. Once the appropriate characteristics are determined, a material removal process can be applied to the iron type golf club head blank 300 to create an iron type golf club head 100 with the desired characteristics. A material removal process can include, for example, machining, computer numerically controlled machining, grinding, polishing, electric discharge machining, etc.

Figure 6:
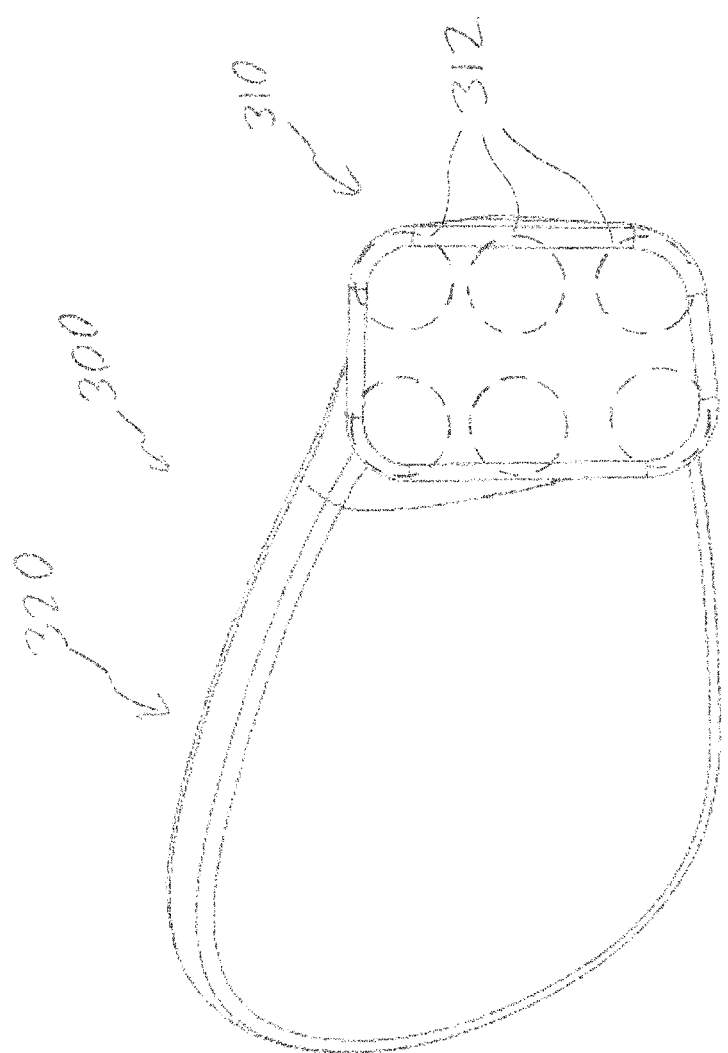
FIG. 6 illustrates a top view of the iron type golf club head blank of FIG. 4.

The club head blank 300 can include an oversized hosel portion 310. The oversized hosel portion 310 can be configured to accommodate a plurality of shaft angle SA configurations for the hosel 110 of an iron type golf club head 100. As illustrated in FIG. 6, the oversized hosel portion 310 can accommodate a plurality of hosel positions 312. In some embodiments, the oversized hosel portion 310 can accommodate a plurality of loft angles LA. In some embodiments, the oversized hosel portion 310 can accommodate a plurality of lie angles LIA. In some embodiments, as illustrated in FIGS. 4-8, the oversized hosel portion 310 of the iron type golf club head blank 300 can accommodate a plurality of loft angles LA as well as a plurality of lie angles LIA. Once the appropriate loft angle LA and/or lie angle LIA are determined, a material removal process can be applied to the oversized hosel portion 310 to create a hosel 110 in the desired orientation.

Additionally, the club head blank 300 can include an oversized body portion 320. The oversized body portion 320 can include an oversized sole portion 350. In some embodiments, the oversized body portion 320 can accommodate a plurality of shapes for the sole 150. Different shapes for the sole can vary characteristics such as bounce, camber, curvature, sole surface area, sole width, leading edge height, etc. In some embodiments, not illustrated, the oversized body portion can accommodate a plurality of lie angles. Once the appropriate characteristics and shape for the sole 150 is selected, a material removal process can be applied to the oversized body portion 320 to create a sole 150 in the desired shape.

FIGS. 9-14 illustrate an additional embodiment of an iron type golf club head blank 400. In some embodiments, as illustrates in FIGS. 9-14, iron type golf club head blank 400 can include an oversized hosel portion 410. The oversized hosel portion 410 can be configured to accommodate a plurality of shaft angle SA configurations for the hosel 110 of an iron type golf club 100. As illustrated in FIG. 11, the oversized hosel portion 410 can accommodate a plurality of hosel positions 412. In some embodiments, the oversized hosel portion 410 can accommodate a plurality of lie angles LIA. The embodiment illustrated in FIGS. 4-8 relies on the oversized hosel portion 310 to accommodate a variety of loft angles LA. The embodiment illustrated in FIGS. 9-14 however, utilizes an oversized body portion 420 to accommodate a plurality of loft angles LA. As illustrated in FIG. 12, the oversized body portion 420 is configured to accommodate a variety of shapes, loft angles LA, and sole shapes of the body portion 120 of an iron type golf club head 100. FIG. 12 includes a few example body portion configurations 422 achievable when utilizing iron type golf club blank 400.

An additional embodiment of an iron type golf club head blank (not illustrated) includes an oversized hosel portion. The oversized hosel portion can be configured to accommodate a plurality of shaft angle SA configurations for the hosel 110 of an iron type golf club 100. The oversized hosel portion can accommodate a plurality of loft angles LA, but not a plurality of lie angles.

An additional embodiment of an iron type golf club head blank (not illustrated) includes an oversized body portion but not an oversized hosel portion. The oversized body portion 320 can include an oversized sole portion.

An additional embodiment of an iron type golf club head blank (not illustrated) includes an oversized hosel portion. The oversized hosel portion can be configured to accommodate a plurality of hosel offsets.

Several iron type golf club head manufacturing methods can incorporate the iron type golf club head blank as described herein. The iron type golf club head blank a portion of the iron type golf club head manufacturing process to be completed before the final specifications are determined for each individual iron type golf club head. In some embodiments, a material removal process can be applied to the iron type golf club head blanks once the specifications for the iron type golf club heads are determined, creating the required iron type golf club heads. In some embodiments, the specifications can be provided on a large scale by the iron type golf club head manufacturer. In some embodiments, the specifications can be provided by pro shops. In some embodiments, the specifications can be provided by retail shops. In some embodiments, the specifications can be provided by golf club fitters. In some embodiments, the specifications can be provided by individual consumers.

A single iron type golf club head blank can accommodate a range of iron type golf club heads. In other words, the iron type golf club head blank has enough material such that a material removal process could transform the iron type golf club head blank into one of a plurality of iron type golf club heads. In one embodiment, the iron type golf club head blank can accommodate loft angles from 17 degrees to 50 degrees. In one embodiment, the iron type golf club head blank can accommodate loft angles from 46 degrees to 62 degrees. In one embodiment, the iron type golf club head blank can accommodate loft angles from 46 degrees to 54 degrees. In one embodiment, the iron type golf club head blank can accommodate loft angles from 54 degrees to 62 degrees. In one embodiment, the iron type golf club head blank can accommodate loft angles from 46 degrees to 50 degrees. In one embodiment, the iron type golf club head blank can accommodate loft angles from 50 degrees to 54 degrees. In one embodiment, the iron type golf club head blank can accommodate loft angles from 48 degrees to 52 degrees. In one embodiment, the iron type golf club head blank can accommodate loft angles from 46 degrees to 48 degrees. In one embodiment, the iron type golf club head blank can accommodate loft angles from 48 degrees to 50 degrees. In one embodiment, the iron type golf club head blank can accommodate loft angles from 50 degrees to 52 degrees. In one embodiment, the iron type golf club head blank can accommodate loft angles from 52 degrees to 54 degrees. In one embodiment, the iron type golf club head blank can accommodate loft angles from 54 degrees to 58 degrees. In one embodiment, the iron type golf club head blank can accommodate loft angles from 58 degrees to 62 degrees. In one embodiment, the iron type golf club head blank can accommodate loft angles from 56 degrees to 60 degrees. In one embodiment, the iron type golf club head blank can accommodate loft angles from 54 degrees to 56 degrees. In one embodiment, the iron type golf club head blank can accommodate loft angles from 56 degrees to 58 degrees. In one embodiment, the iron type golf club head blank can accommodate loft angles from 58 degrees to 60 degrees. In one embodiment, the iron type golf club head blank can accommodate loft angles from 60 degrees to 62 degrees.

In one embodiment, the iron type golf club head blank can accommodate lie angles from 58 degrees to 66 degrees. In one embodiment, the iron type golf club head blank can accommodate lie angles from 58 degrees to 62 degrees. In one embodiment, the iron type golf club head blank can accommodate lie angles from 62 degrees to 66 degrees. In one embodiment, the iron type golf club head blank can accommodate lie angles from 60 degrees to 64 degrees. In one embodiment, the iron type golf club head blank can accommodate lie angles from 58 degrees to 60 degrees. In one embodiment, the iron type golf club head blank can accommodate lie angles from 60 degrees to 62 degrees. In one embodiment, the iron type golf club head blank can accommodate lie angles from 62 degrees to 64 degrees. In one embodiment, the iron type golf club head blank can accommodate lie angles from 64 degrees to 66 degrees.

In one embodiment, the iron type golf club head blank can accommodate sole bounce angles from 0 degrees to 14 degrees. In one embodiment, the iron type golf club head blank can accommodate sole bounce angles from 0 degrees to 7 degrees. In one embodiment, the iron type golf club head blank can accommodate sole bounce angles from 7 degrees to 14 degrees. In one embodiment, the iron type golf club head blank can accommodate sole bounce angles from 4 degrees to 14 degrees. In one embodiment, the iron type golf club head blank can accommodate sole bounce angles from 8 degrees to 14 degrees. In one embodiment, the iron type golf club head blank can accommodate sole bounce angles from 0 degrees to 4 degrees. In one embodiment, the iron type golf club head blank can accommodate sole bounce angles from 4 degrees to 7 degrees. In one embodiment, the iron type golf club head blank can accommodate sole bounce angles from 7 degrees to 10 degrees. In one embodiment, the iron type golf club head blank can accommodate sole bounce angles from 10 degrees to 14 degrees. In one embodiment, the iron type golf club head blank can accommodate sole bounce angles from 8 degrees to 10 degrees. In one embodiment, the iron type golf club head blank can accommodate sole bounce angles from 10 degrees to 12 degrees. In one embodiment, the iron type golf club head blank can accommodate sole bounce angles from 12 degrees to 14 degrees.

Figure 6B:
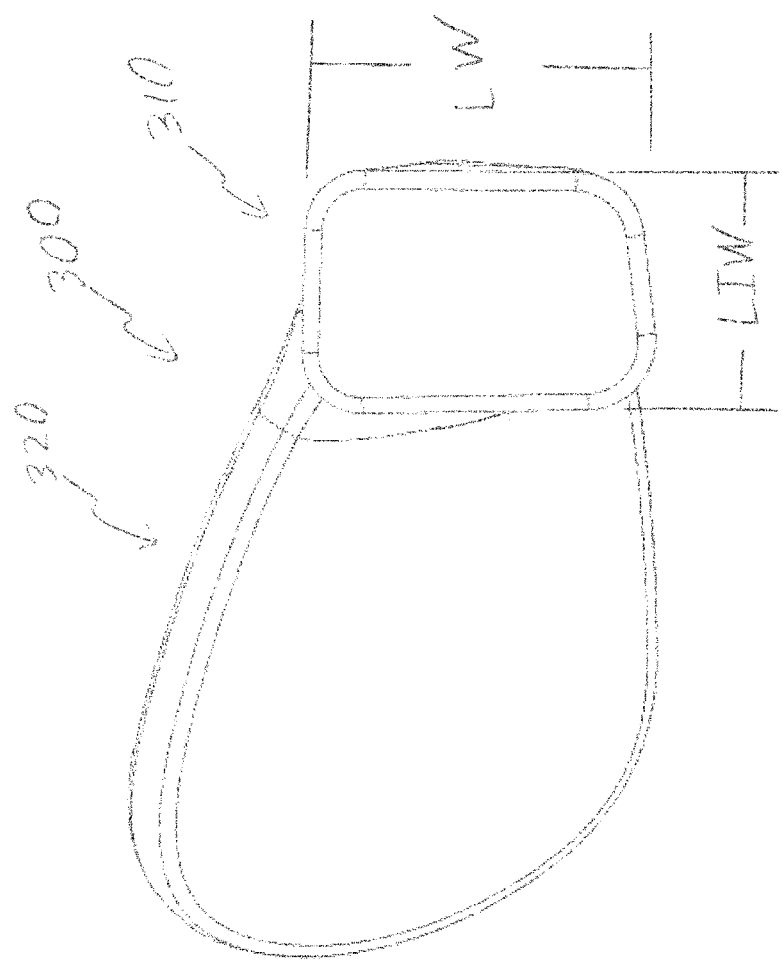
FIG. 6B illustrates a top view of the iron type golf club head blank of FIG. 4.
Figure 7:
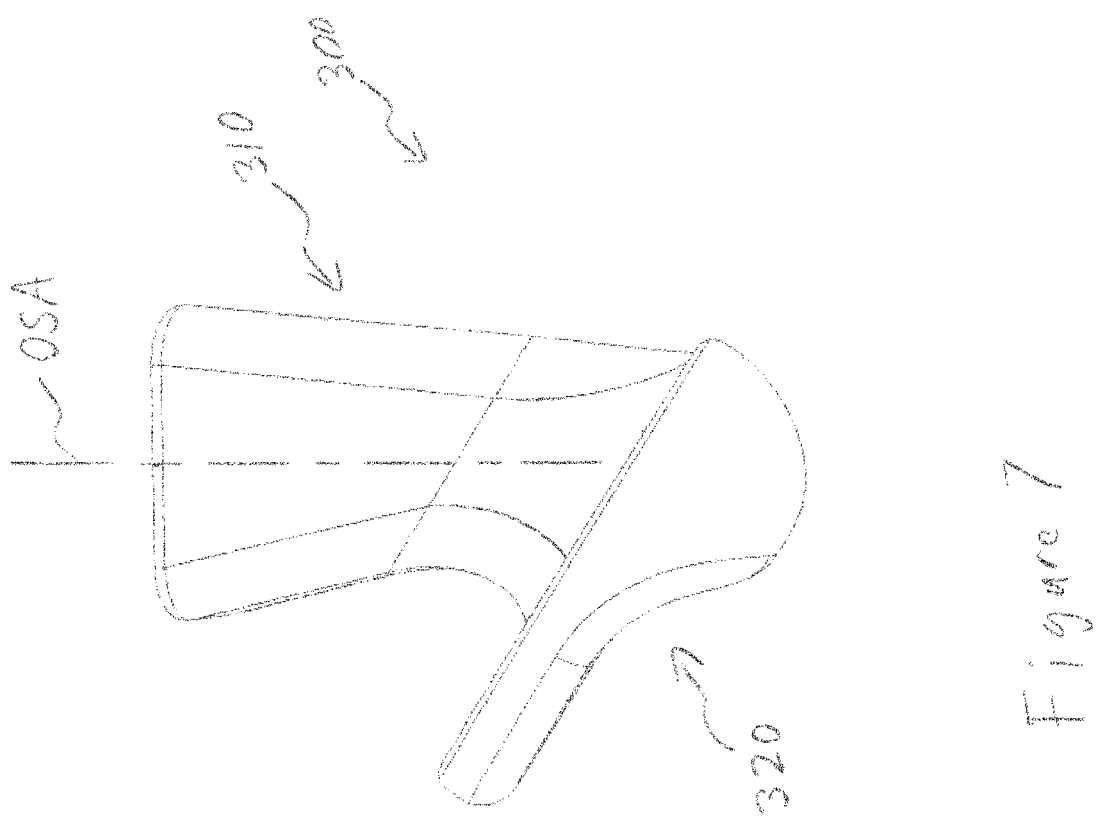
FIG. 7 illustrates a side view of the iron type golf club head blank of FIG. 4.
Figure 8:
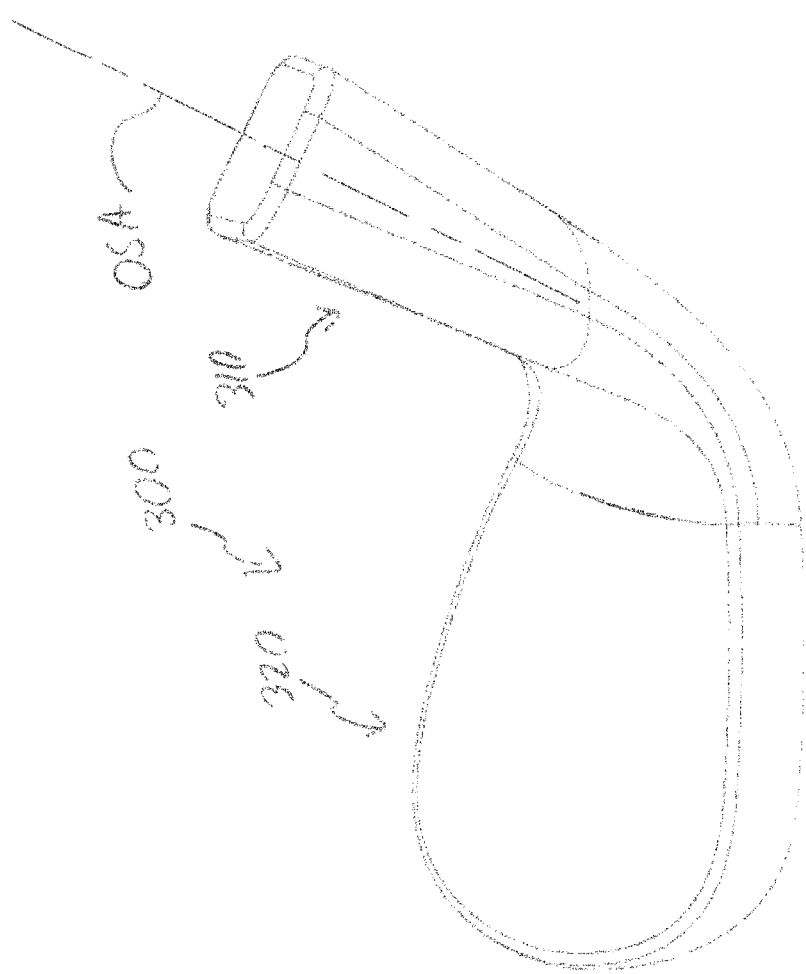
FIG. 8 illustrates a front view of the iron type golf club head blank of FIG. 4.
Figure 9:
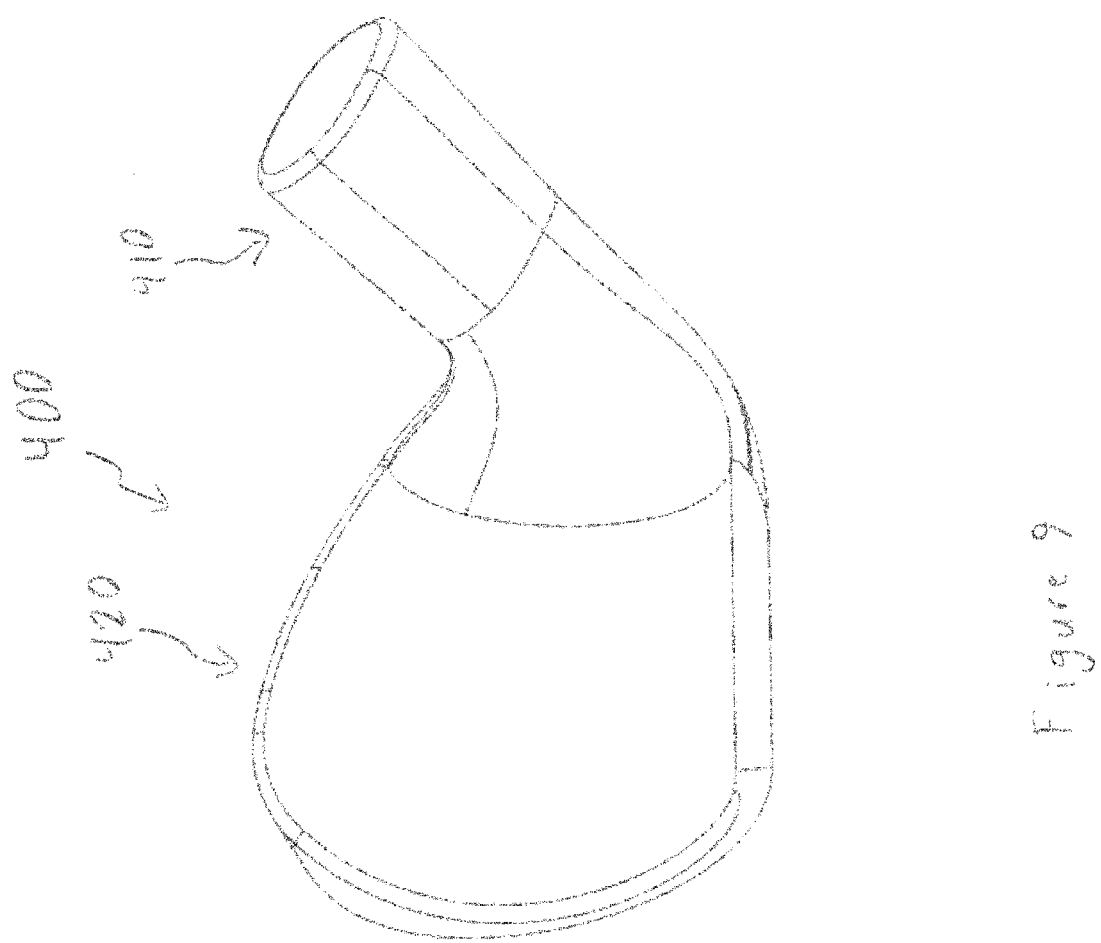
FIG. 9 illustrates a perspective view of an additional embodiment of an iron type golf club head blank.
Figure 10:
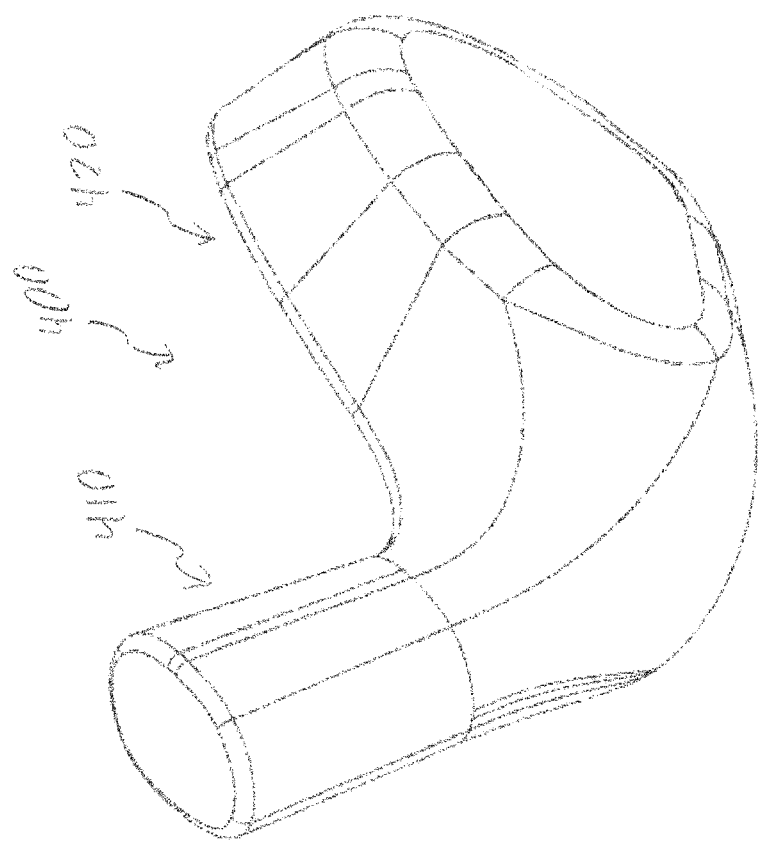
FIG. 10 illustrates an additional perspective view of the iron type golf club head blank of FIG. 9.

As illustrated in FIGS. 6B and 11B, measured at the uppermost portion of the oversize hosel portion 310, 410 and perpendicularly to the oversized shaft axis OSA, the oversized hosel portion 310, 410 has a loft width LW and a lie width LIW. As illustrated in FIGS. 7 and 8, the oversized shaft axis OSA of the oversized hosel portion 310 is defined by the average loft angle LA and lie angle LIA of all the possible shaft axis SA configurations with the particular iron type golf club head blank 300, 400. Loft width LW is measured perpendicularly to lie width LIW. Lie width LIW is measured in a substantially heel to toe direction.

In one embodiment, the oversized hosel portion 310, 410 can have a loft width LW greater than 15 millimeters (mm). In one embodiment, the oversized hosel portion 310, 410 can have a loft width LW greater than 20 mm. In one embodiment, the oversized hosel portion 310, 410 can have a loft width LW greater than 25 mm. In one embodiment, the oversized hosel portion 310, 410 can have a loft width LW greater than 30 mm. In one embodiment, the oversized hosel portion 310, 410 can have a loft width LW greater than 35 mm. In one embodiment, the oversized hosel portion 310, 410 can have a lie width LIW greater than 15 mm. In one embodiment, the oversized hosel portion 310, 410 can have a lie width LIW greater than 17 mm. In one embodiment, the oversized hosel portion 310, 410 can have a lie width LIW greater than 19 mm. In one embodiment, the oversized hosel portion 310, 410 can have a lie width LIW greater than 21 mm. In one embodiment, the oversized hosel portion 310, 410 can have a lie width LIW greater than 23 mm. In one embodiment, the oversized hosel portion 310, 410 can have a lie width LIW greater than 25 mm. In one embodiment, the oversized hosel portion 310, 410 can have a lie width LIW greater than 27 mm.

In one embodiment, the oversized hosel portion 310, 410 can have loft width LW greater than 20 mm and a lie width LIW greater than 15 mm. In one embodiment, the oversized hosel portion 310, 410 can have loft width LW greater than 20 mm and a lie width LIW greater than 20 mm. In one embodiment, the oversized hosel portion 310, 410 can have loft width LW greater than 25 mm and a lie width LIW greater than 15 mm. In one embodiment, the oversized hosel portion 310, 410 can have loft width LW greater than 25 mm and a lie width LIW greater than 20 mm. In one embodiment, the oversized hosel portion 310, 410 can have loft width LW greater than 30 mm and a lie width LIW greater than 20 mm.

In describing the present technology herein, certain features that are described in the context of separate implementations also can be implemented in combination in a single implementation. Conversely, various features that are described in the context of a single implementation also can be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure as well as the principle and novel features disclosed herein.

We claim:

1. A method of manufacturing an iron type golf club head, comprising:
   forming a single iron type golf club head blank;
   said iron type golf club head blank comprising an oversized hosel portion that is larger than a final hosel portion of said iron type golf club head and an oversized body portion that is larger than a final body portion of said iron type golf club head, said iron type golf club head blank configured to be oversized to accommodate the forming of a plurality of iron type golf club heads when material is removed from the golf club head blank, said plurality of iron type golf club heads comprising a first club head and a second club head, said first golf club head having a first loft angle, said second club head have a second loft angle, wherein said first loft angle is different than said second loft angle;
   selecting either said first golf club head or said second golf club head; and
   removing material from said oversized body portion of said iron type golf club head blank to form the final body portion of said iron type golf club head to achieve said first loft angle or said second loft angle according to which of the first golf club head and the second golf club head are selected.

2. The method of claim 1, further comprising specifying a desired loft angle and selectively removing material from said oversized body portion to attain said desired loft angle.

3. The method of claim 2, wherein said first loft angle is 17 degrees and said second loft angle is 60 degrees.

4. The method of claim 1, wherein said first golf club head has a first lie angle, wherein said second golf club head has a second lie angle, wherein said first lie angle is different from said second lie angle.

5. The method of claim 4, further comprising specifying a desired lie angle and selectively removing material from said oversized hosel portion to attain said desired lie angle.

6. The method of claim 5, wherein said first lie angle is 58 degrees and said second lie angle is 66 degrees.

7. The method of claim 5, wherein said oversized hosel portion comprises an oversized shaft axis, a lie width, and a loft width, said lie width measured in a substantially heel toe direction, said loft width measured perpendicular to said lie width, wherein said lie width of said iron type golf club head blank is greater than 20 mm and wherein removing material from said oversized hosel portion comprises reducing said lie width.

8. A method of manufacturing an iron type golf club head, comprising:
forming a single iron type golf club head blank;
said iron type golf club head blank having an oversized hosel portion that is larger than a final hosel portion of said iron type golf club head, said iron type golf club head blank configured to be oversized to accommodate the forming of a plurality of iron type golf club heads when material is removed from the golf club head blank, said plurality of iron type golf club heads comprising a first club head and a second club head, said plurality of iron type golf club heads comprising a first club head and a second club head, said first golf club head having a first lie angle, said second club head have a second lie angle, wherein said first lie angle is different than said second lie angle;
selecting either said first golf club head or said second golf club head; and
removing material from said oversized hosel portion of said iron type golf club head blank to form the final hosel portion of said iron type golf club head to achieve said first lie angle or said second lie angle according to which of the first golf club head and the second golf club head are selected.

9. The method of claim 8, further comprising specifying a desired lie angle and selectively removing material from said oversized hosel portion to attain said desired lie angle.

10. The method of claim 9, wherein said first lie angle is 58 degrees and said second lie angle is 66 degrees.

11. The method of claim 9, wherein said oversized hosel portion comprises an oversized shaft axis, a lie width, and a loft width, said lie width measured in a substantially heel toe direction, said loft width measured perpendicular to said lie width, wherein said lie width of said iron type golf club head blank is greater than 20 mm and wherein removing material from said oversized hosel portion comprises reducing said lie width.

12. A method of manufacturing an iron type golf club head, comprising:
forming a single iron type golf club head blank;
said iron type golf club head blank having an oversized hosel portion that is larger than a final hosel portion of said iron type golf club head, said iron type golf club head blank configured to be oversized to accommodate the forming of a plurality of iron type golf club heads when material is removed from the golf club head blank, said plurality of iron type golf club heads comprising a first club head and a second club head, said first golf club head having a first loft angle, said second club head have a second loft angle, wherein said first loft angle is different than said second loft angle;
selecting either said first golf club head or said second golf club head; and
removing material from said oversized hosel portion of said iron type golf club head blank to form the final hosel portion of said iron type golf club head to achieve said first loft angle or said second loft angle according to which of the first golf club head and the second golf club head are selected.

13. The method of claim 12, further comprising specifying a desired loft angle and selectively removing material from said oversized hosel portion to attain said desired loft angle.

14. The method of claim 13, wherein said first loft angle is 17 degrees and said second loft angle is 60 degrees.

15. The method of claim 13, wherein said oversized hosel portion comprises an oversized shaft axis, a lie width, and a loft width, said lie width measured in a substantially heel toe direction, said loft width measured perpendicular to said lie width, wherein said loft width of said iron type golf club head blank is greater than 20 mm and wherein removing material from said oversized hosel portion comprises reducing said loft width.

16. The method of claim 13, wherein forming said iron type golf club head blank comprises forging said iron type golf club head blank and wherein removing material from said oversized hosel portion comprises machining said iron type golf club head blank.

17. The method of claim 12, wherein said first golf club head has a first lie angle, wherein said second golf club head has a second lie angle, wherein said first lie angle is different from said second lie.

18. The method of claim 17, further comprising specifying a desired lie angle and selectively removing material from said oversized hosel portion to attain said desired lie angle.

19. The method of claim 18, wherein said first lie angle is 58 degrees and said second lie angle is 66 degrees.

20. The method of claim 18, wherein said oversized hosel portion comprises an oversized shaft axis, a lie width, and a loft width, said lie width measured in a substantially heel toe direction, said loft width measured perpendicular to said lie width, wherein said lie width of said iron type golf club head blank is greater than 20 mm and wherein removing material from said oversized hosel portion comprises reducing said lie width.

* * * * *